(12) United States Patent
Wilkinson et al.

(10) Patent No.: US 8,632,927 B2
(45) Date of Patent: Jan. 21, 2014

(54) MEMBRANELESS FUEL CELL AND METHOD OF OPERATING SAME

(75) Inventors: David P. Wilkinson, North Vancouver (CA); Alfred Lam, Vancouver (CA)

(73) Assignee: National Research Council of Canada, Ontario (CA)

( * ) Notice: Subject to any disclaimer, the term of this patent is extended or adjusted under 35 U.S.C. 154(b) by 853 days.

(21) Appl. No.: 12/598,371

(22) PCT Filed: Apr. 30, 2008

(86) PCT No.: PCT/CA2008/000843
§ 371 (c)(1),
(2), (4) Date: Feb. 25, 2010

(87) PCT Pub. No.: WO2008/131564
PCT Pub. Date: Nov. 6, 2008

(65) Prior Publication Data
US 2010/0151354 A1    Jun. 17, 2010

Related U.S. Application Data

(60) Provisional application No. 60/924,091, filed on Apr. 30, 2007.

(51) Int. Cl.
*H01M 8/04* (2006.01)
*H01M 8/16* (2006.01)
*H01M 8/06* (2006.01)
*H01M 8/22* (2006.01)
*H01M 4/02* (2006.01)
*H01M 4/36* (2006.01)

(52) U.S. Cl.
USPC ........... 429/513; 429/401; 429/409; 429/502; 429/512; 429/523

(58) Field of Classification Search
USPC .................. 429/512, 513, 523, 401, 409, 502
See application file for complete search history.

(56) References Cited

U.S. PATENT DOCUMENTS

| | | | |
|---|---|---|---|
| 5,672,439 A | 9/1997 | Wilkinson et al. | |
| 5,874,182 A | 2/1999 | Wilkinson et al. | |
| (Continued) | | | |

FOREIGN PATENT DOCUMENTS

| | | |
|---|---|---|
| WO | 03106966 A2 | 12/2003 |
| WO | 2005104279 A2 | 11/2005 |

OTHER PUBLICATIONS

International Search Report of PCT/CA2008/000843.

(Continued)

*Primary Examiner* — Patrick Joseph Ryan
*Assistant Examiner* — Julian Anthony
(74) *Attorney, Agent, or Firm* — Ryan A. Schneider, Esq.; Troutman Sanders LLP

(57) ABSTRACT

A direct fuel cell comprises a cathode comprising electroactive catalyst material; and an anode assembly comprising an anode having a porous layer and electroactive catalyst material in the porous layer. The electrode characteristics of the anode assembly are selected so that fuel supplied to the anode is reacted within the anode so that cross-over from the anode to the cathode does not have more than a 10% negative effect on voltage or a 25 mV voltage loss when at peak power and steady state conditions. The anode and cathode each have a first major surface facing each other in non-electrical contact and without a microporous separator or ion exchange membrane therebetween.

19 Claims, 17 Drawing Sheets

(56) References Cited

U.S. PATENT DOCUMENTS

| | | |
|---|---|---|
| 6,296,964 B1 | 10/2001 | Ren et al. |
| 6,613,464 B1 | 9/2003 | Wilkinson et al. |
| 6,620,542 B2 | 9/2003 | Pan |
| 6,713,206 B2 | 3/2004 | Markoski et al. |
| 7,157,177 B2 | 1/2007 | Chan |
| 7,198,867 B2 | 4/2007 | Sanders |
| 7,297,430 B2 | 11/2007 | Beckmann et al. |
| 7,306,869 B2 | 12/2007 | Leach et al. |
| 2004/0058203 A1 | 3/2004 | Priestnall et al. |
| 2004/0072047 A1 | 4/2004 | Markoski et al. |
| 2005/0106425 A1 | 5/2005 | Damore et al. |
| 2005/0208343 A1 | 9/2005 | Kim et al. |
| 2006/0003217 A1 | 1/2006 | Cohen et al. |
| 2006/0210867 A1* | 9/2006 | Kenis et al. .............. 429/101 |
| 2006/0228622 A1 | 10/2006 | Cohen et al. |
| 2007/0026286 A1 | 2/2007 | Chung et al. |

OTHER PUBLICATIONS

Written Opinion for PCT/CA2008/000843.

Dec. 23, 2011—Supplementary Search Report for EP2149170, published Jan. 25, 2012.

Aug. 31, 2012—First Examination Report for EP2149170, published Oct. 3, 2012.

Bazylak, A.; Sinton, D.; Djilai, N.; "Improved fuel utilization in microfluidic fuel cells: a computational study." J. Power Sources 143 (2005) 57-66.

Qian, W.; Wilkinson, D.P.; Shen, J.; Wang, H.; Zhang, J. "Architecture for portable direct liquid fuel cells." J. Power Sources (2006), 154,202-213.

Ferrigno, R.; Stroock, A.D.; Clark, T.D.; Mayer, M. Whitesides, G.M. "Membraneless vanadium redox fuel cell using laminar flow." J. Am. Chem. Soc. (2002), 124, 12930-12931.

Choban, E.R.; Spendelow, J.R.; Gancs, L.; Wieckowski, A.; Kenis, P.J.A. "Membraneless laminar flow-based micro fuel cells operating in alkaline, acidic and acidic/alkaline media." Electrochem. Acta (2005), 50, 5390-5398.

Choban, E.R.; Markoski, L.J.; Wieckowski, A.; Kenis, P.J.A. "Microfluidic fuel cell based on laminar flow." J. Power Sources (2004), 128, 54-60.

Chang, M.H. Chen, F.; Fang, N.-S. "Analysis of membraneless fuel cell using laminar flow in a Y-shaped microchannel." J. Power Sources (2006), 159, 810-816.

Martin, J.J.; Qian, W.; Wang, H.; Neburchilov, V., Zhang, Y.; Wilkinson, D.P.; Chang, Z. "Design and testing of a passive planar three-cell DMFC." J. Power Sources (2007), 164, 287-292.

8. Topcagic, S.; Minteer, S.D.; "Development of a Membraneless Ethanol/Oxygen Biofuel Cell." Electrochimica Acta 51 (2006), 2168-2172.

* cited by examiner

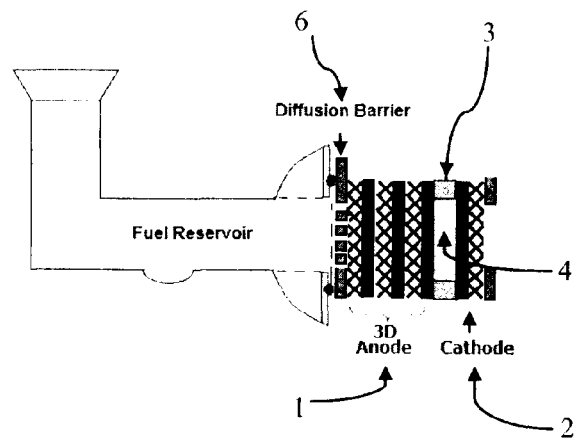
Figure 4
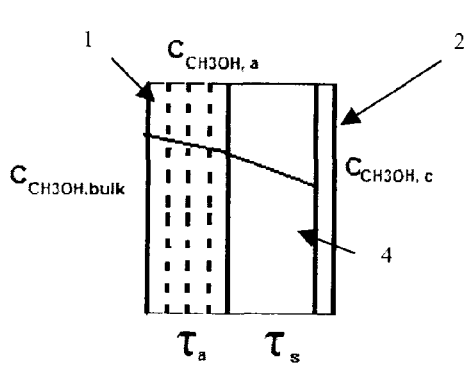 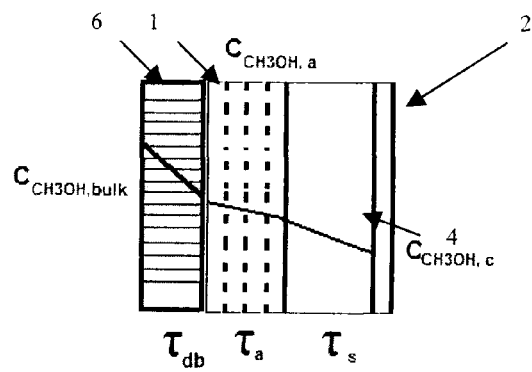
Figure 5(a)                    Figure 5(b)

MEMBRANELESS FUEL CELL AND METHOD OF OPERATING SAME

FIELD OF THE INVENTION

This invention relates generally to fuel cells, and in particular to a fuel cell which does not require a microporous separator or an ion exchange membrane ("separator-free fuel cell") and a method of operating same.

BACKGROUND OF THE INVENTION

Concerns over the environmental impact of mankind's energy needs and use have created an increased interest in cleaner forms of energy generation. Fuel cells offer a solution to this problem due to their use of cleaner and renewable fuels, their higher energy densities and efficiencies, and their reduced emissions. A fuel cell is an energy conversion device bearing electrodes upon which electrochemical reactions occur in order to transform stored chemical energy into electrical energy. In a typical fuel cell, a fuel (for example, hydrogen gas or an alcohol) is oxidized at an anode, providing electrons that travel through an external circuit and can be used as electricity in an external load, and releasing (generally) protons, which are transported through an ion exchange membrane to a cathode side of the device. The circuit is completed within the device when the electrons reach the cathode, and combine with the protons in a reduction reaction, generally reducing oxygen to form water.

In order to improve the efficiency and selectivity of the oxidation and reduction reactions occurring on the corresponding electrodes within a fuel cell, electrocatalyst materials are typically incorporated into the electrodes. Generally, these catalysts are comprised of particulate noble metals.

The transport of protons from anode to cathode in the fuel cell is a critical and non-trivial process. The dominant method in the art that provides the appropriate scalability, generality, efficiency and manufacturing practicality is the use of polymer electrolyte membranes (PEMs). PEMs have been designed from a number of materials, but key properties that the PEM must possess are high ionic transport (of protons generally), physical robustness for manufacturing and fuel cell durability, and chemical stability to fuels and other additives. As a result, the preferred materials used for this purpose are expensive and constitute a significant portion of the materials cost of a fuel cell. Also, the membranes tend to present certain operational challenges, such as keeping the membrane sufficiently hydrated to conduct ions. While efforts are being made to lower the costs and improve performance of the PEM via a variety of methods and materials choices, the membrane still presents very significant cost and technical challenges to the overall fuel cell design.

Direct fuel cells (DFCs) use liquid fuels directly as the fuel, and a number of architectures of these are well known in the art; examples of known liquid fuels for DFCs include methanol, ethanol, other alcohols, formic acid, hydrazine, and borohydride. DFCs are simpler from a systems standpoint compared to gaseous reformate based fuel cells which require means to convert a feedstock fuel to a form usable by the fuel cell (i.e. "reformate"). DFCs also typically have a much higher volumetric energy density, and are generally safer to store, transport and refill when compared to fuel cells operating on gaseous fuel such as pure hydrogen or reformate. However there are significant performance issues with the DFCs, which include fuel cross-over, water cross-over, and poor anode and cathode catalyst kinetics. Currently, platinum group metals are typically used as catalyst materials for both half reactions. This contributes to the loss of cell voltage potential, as any fuel that crosses over into the cathode chamber will oxidize and depolarize the cathode.

Present efforts to address the performance issues with the DFC include attempts to reduce the fuel concentration of the fuel stream, to develop more fuel-tolerant cathode catalysts, and to develop membranes that are more resistant to fuel cross-over. These approaches all have drawbacks. Reducing the fuel concentration reduces the volumetric energy density of the fuel cell and is undesirable for compact power applications. Improving the membrane design is particularly challenging, as the PEM's performance is dependent on a number of factors, such as the effect of humidity on conductivity, inherent resistance of the membrane resulting in ohmic losses, and the inherent fragility of the membrane. As a result, engineering membranes with improved cross-over resistance has proven to be expensive and complex.

Fuel cells that can operate without a membrane have been reported; see for example patent application US2008/0057381. These fuel cells are known as "one pot" designs in which the anode and cathode are immersed in a mixed reactant solution, i.e. both fuel and oxidant are present in the same solution. In order for the electrodes in such fuel cells to properly function, only fuel and oxidant tolerant catalyst materials can be used. An example of one pot fuel cell design employs biological-based catalysts for one or both of the anode and cathode. These enzymatic catalysts are tolerant to the fuel and oxidant, and thus can operate in a single reaction medium without a membrane or other barrier separating the anode and cathode. Furthermore, such specialized catalyst materials present additional complexity and do not offer the performance of conventional catalyst materials such as platinum group metals

SUMMARY OF THE INVENTION

One object of the invention is to provide a solution to at least some of the deficiencies in the prior art.

Another object of this invention is to provide a means to eliminate the separator from a fuel cell without sacrificing performance and scalability of the fuel cell. Such a separator includes a microporous separator and an ion exchange membrane such as a PEM.

Yet another object of the invention is to optimize the available triple phase boundary (TPB) area, while simultaneously lowering component costs of the fuel cell, by removing the separator. The simplified design can lower costs (no separator used) and avoid ohmic losses.

According to one aspect of the invention, there is provided a direct fuel cell that does not have a separator in between its anode and cathode, and which reacts a sufficient amount of fuel at the anode that the cathode can utilize catalyst material that does not need to be tolerant to the fuel. The overall cost and size of the fuel cell is reduced by removing the separator; furthermore, the efficiency of the fuel cell is improved over those fuel cells that are required to use fuel-tolerant catalytic material.

In particular, the fuel cell comprises: a cathode comprising an electroactive catalyst material; and an anode assembly comprising an anode with at least one porous layer and electroactive catalyst material in the porous layer. The electrode characteristics of the anode assembly (.e.g. porous layer porosity, catalyst distribution and quantity) are selected so that the fuel is substantially reacted or eliminated before reaching the cathode. To be substantially reacted, a sufficient amount of fuel supplied to the anode is reacted within the anode so that cross-over from the anode to the cathode does not have more than a 10% negative effect on voltage or a 25 mV voltage loss when at peak power and at steady state conditions. Further, the anode and cathode each has a first major surface facing each other that are in non-electrical contact and do not have a microporous separator or ion exchange membrane there between.

Because so little (if any) fuel crosses over to the cathode, the cathode's catalyst can comprise a platinum group metal catalyst instead of a lower performing fuel tolerant catalytic material.

In the anode, the catalyst can be distributed through the thickness of the porous layer. Alternatively or additionally, the anode can comprise multiple catalyst-containing porous layers in adjacent contacting and stacked arrangement.

The fuel supplied to the anode can be in a solution that contains both fuel and electrolyte; one suitable fuel and electrolyte solution is an aqueous methanol and sulfuric acid solution. Other suitable fuels can be selected from the group consisting of electroactive alcohols, electroactive organic acids, and eleectroactive ethers. For example, other alternative fuels include propanol, methanol, formic acid, acetic acid, borohydride, ethanol, dimethylether, dimethoxymethane, trimethoxy methane, and Trioxane. The fuel can be aqueous or non-aqueous; for example, the fuel can be 100% formic acid, and can use alkaline and acid electrolytes.

In this case, the anode assembly is sufficiently porous for the fuel electrolyte to transport through the anode assembly. The anode assembly can further comprises a fuel reservoir in fluid communication with a second major surface of the porous layer which is oppositely facing the anode's first major surface. The fuel reservoir contains the fuel and electrolyte solution. The anode assembly can further comprise a diffusion barrier such as perforated graphitic sheet or perforated metal that is located between the fuel reservoir and the anode. The diffusion barrier can be made from any porous material and can be either electrically conductive or insulating; when electrically conductive, the separator can act as a current collector. The electrode characteristics selected to sufficiently react the fuel can include the characteristics of the diffusion barrier such as one or more of the thickness, pore size, shape, hydrophobicity and distribution of the pores/openings.

The anode and cathode can be spaced from each other by an electrolyte chamber which is designed to contain a solution of electrolyte. Preferably, the amount of fuel supplied to the anode is reacted within the anode so that cross-over from the anode to the cathode does not have more than a 10% negative effect on voltage or a 25 mV voltage loss when at peak power and steady state operating conditions.

Alternatively, at least one of the facing first major surfaces of the anode and cathode can be coated with an electrically non-conducting material and the facing first major surfaces are in physical but not electrical contact with each other. The non-conducting material can be any electrically insulating polymer or other material that can be coated onto the surface.

BRIEF DESCRIPTION OF THE DRAWINGS

FIG. 4 is schematic illustration of the membraneless fuel cell with a diffusion barrier according to another embodiment of the invention.

FIGS. 5(a) and (b) are schematic illustrations of the membraneless fuel cell with and without the diffusion barrier.

DETAILED DESCRIPTION OF EMBODIMENTS OF THE INVENTION

Other aspects and features of the present invention will become apparent to those ordinarily skilled in the art upon review of the following description of specific embodiments of the invention in conjunction with the accompanying figures.

Any terms not directly defined herein shall be understood to have the meanings commonly associated with them as understood within the art of the invention. Certain terms are discussed below, or elsewhere in the specification, to provide additional guidance to the practitioner in describing the devices, methods and the like of embodiments of the invention, and how to make or use them. It will be appreciated that the same thing may be said in more than one way. Consequently, alternative language and synonyms may be used for any one or more of the terms discussed herein. No significance is to be placed upon whether or not a term is elaborated or discussed herein. Some synonyms or substitutable methods, materials and the like are provided. Recital of one or a few synonyms or equivalents does not exclude use of other synonyms or equivalents, unless it is explicitly stated. Use of examples in the specification, including examples of terms, is for illustrative purposes only and does not limit the scope and meaning of the embodiments of the invention herein.

The embodiments described herein relate generally to a separator-free architecture for fuel cells, i.e. a fuel cell that does not use an ion exchange membrane, microporous membrane or other type of separator, and a method for operating same. The separator-free fuel cell may be operated in passive conditions wherein the anode is immersed in fuel, or in active (conventional) conditions wherein fuel is flowed across the anode surface at a selected rate. In both cases, fuel diffuses through the anode and is substantially completely reacted such that little or no fuel reaches the cathode despite the absence of an ion exchange membrane or other type of separator between the cathode and anode. Therefore, conventional PGM catalyst material can be used at the cathode instead of fuel-tolerant catalyst material used in mixed reactant membraneless fuel cell designs.

Figures 1A, 1B:
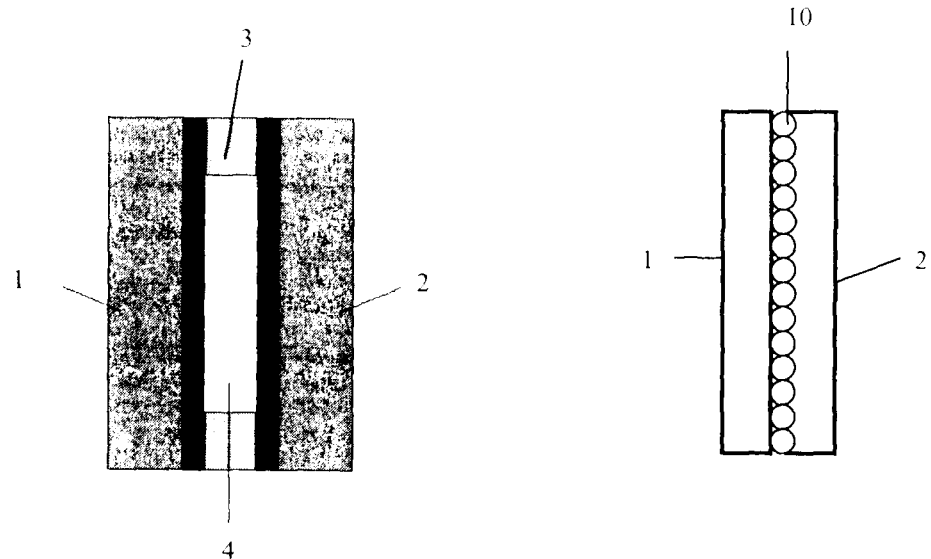
FIGS. 1(a) and (b) are schematic illustrations of two embodiments of a membraneless fuel cell according to the invention.

According to one embodiment of the invention and referring to FIG. 1(a), the separator-free fuel cell comprises an anode 1 and cathode 2, and a chamber 4 in between the anode 1 and cathode 2 for containing a liquid electrolyte. According to a second embodiment of the invention and referring to FIG. 1(b), the separator-free fuel cell comprises an anode 1 and cathode 2 in which one or both of the anode and cathode surfaces are coated with an electrically non-conductive material 10, such that the anode 1 and cathode 2 surfaces are physically contacting each other but are not in electrical contact.

The liquid electrolyte is an ion conducting medium that provides ionic communication between the anode and cathode portions of the fuel cell. This communication allows the transport of ions (in this case, protons) from the fuel oxidizing anode to the cathode 2. In the present embodiments, an aqueous solution is used which contains both fuel and the electrolyte. A suitable liquid electrolyte is sulfuric acid; however the electrolyte medium may be any of a number of media that allow ionic conduction. The electrolyte medium may be acidic or alkaline in nature. The fuel may be an electroactive alcohol, electroactive organic acid, or an electroactive ether. More particularly, the fuel can be selected from the group consisting of propanol, methanol, formic acid, acetic acid, borohydride, ethanol, dimethylether, dimethoxymethane, trimethoxy methane, Trioxane, or other fuels suitable for oxidation in a direct fuel cell. The fuel can be in aqueous solution or be non-aqueous; for example, the fuel can be 100% formic acid. One suitable fuel/electrolyte solution for use with the two fuel cell embodiments is 1M methanol & 0.5M $H_2SO_4$/$H_2O$ solution.

Figure 3:
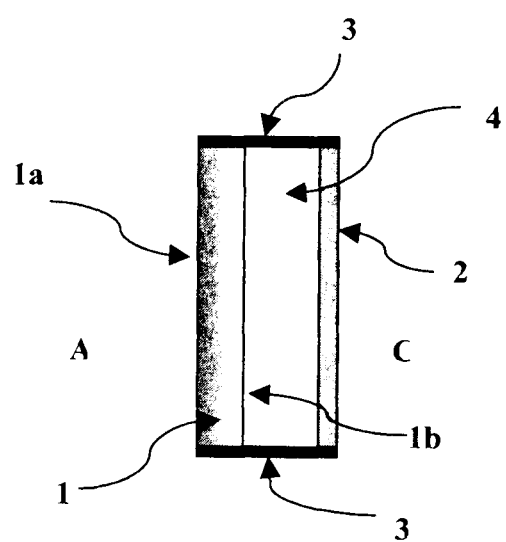
FIG. 3 is a schematic side view of components of the membraneless fuel cell shown in FIG. 1(a).

Referring now to FIG. 3, the first embodiment of the separator-free fuel cell as shown in FIG. 1(a) is described in more detail. The fuel cell comprises a fluid permeable anode 1 comprising a porous layer that has a first, outer, face 1a and a second, inner, face 1b that faces a cathode 2. Located between the anode 1 and cathode 2 is an o-ring gasket 3 which serves to space the anode 1 and cathode 2 apart from each other, as well as to define an inner electrolyte chamber 4 in between the anode 1 and cathode 2. The o-ring gasket 3 serves as a fluid barrier so that the liquid electrolyte is contained in the electrolyte chamber 4 without any leakage in the radial direction. While an o-ring gasket 3 is used in this embodiment, other gaskets or structures capable of spacing the anode 1 and cathode 2 apart and serving as a fluid barrier for containing electrolyte in the electrolyte chamber 4 can be used. Spacing the electrodes from each other is one way to prevent the electrodes from touching and short circuiting.

The anodic side of the fuel cell A and the cathodic side C are isolated from each other by the electrodes 1, 2 and the electrolyte chamber 4. A fuel reservoir (not shown in this Figure) on the anode side of the fuel cell A is fluidly coupled to the anode 1, and contains the fuel/electrolyte solution. A cathode compartment (not shown) on the cathodic side of the fuel cell C is open to air for passive air breathing fuel cells, and can alternatively have air flowing across the cathode for active air breathing fuel cells. Also, oxidants other than air can be used. When the fuel/electrolyte solution is supplied to a first outer face 1a of a porous layer of the anode, the fuel/electrolyte permeates through the anode porous layer. During normal fuel cell operation, the fuel permeates through the first face 1a and is preferably substantially completely oxidized within the body of the anode porous layer, such that substantially no fuel passes the inner face 1b of the anode porous layer into the inner chamber 4. However, the anode 1 can be designed to allow some fuel to crossover to the cathode 2, so long as the amount of crossover is low enough not to reduce the performance of the cell below a commercially useful amount. The conventionally accepted upper limit of fuel crossover for direct fuel cells is that which does not have more than a 10% negative effect on voltage or a 25 mV voltage loss when operated at peak power and at steady state conditions.

In order for the anode to substantially completely react the fuel, there must be sufficient catalyst activity in the anode 1. Sufficient catalyst activity is achieved by providing a sufficient catalyst loading and distribution in the anode structure that will substantially completely react the fuel at the rate at which fuel is diffused through the anode (flux), or at least react enough of the fuel that fuel cross over does not have more than a 10% negative effect on voltage or a 25 mV voltage loss when operated at peak power and at steady state conditions. The fuel flux is determined by the concentration present in the fuel/electrolyte solution and at the material properties of the anode 1.

Catalyst particles, selected to effectively promote the oxidation of the fuel, are distributed between the surfaces 1a, 1b of the anode porous layer. The catalyst particles may be distributed substantially uniformly throughout the thickness of the porous layer between the anode surfaces 1a, 1b, or may be distributed non-uniformly, for example in discrete layers or regions. Sufficient catalyst is provided so that a sufficient amount of fuel is reacted in the anode for useful voltage output by the fuel cell. The thickness of the anode 1 and the quantity of catalyst required will depend for example of the rate of fuel supply to the anode 1 and the rate of fluid transport through the anode 1. In one example of the anode 1, a porous material is provided comprising one or more layers of carbon particles mixed with a polymeric binder, and catalyst particles are distributed throughout the porous material. In another example of the anode 1, the porous material is a glass fiber mat or expanded (porous) polytetrafluoroethylene and a matrix of carbon particles and a polymeric binder which, along with catalyst particles, is distributed throughout the thickness of the mat. In a preferred example of the anode 1, the porous material is a carbon cloth and a matrix of carbon particles and a polymeric binder which, along with the catalyst particles is distributed throughout the thickness of the carbon cloth. In all of these examples, the porous layer should have properties that provide sufficient strength and rigidity to serve as a support structure for the anode 1, given that the electrolyte chamber 4 results in an unsupported gap between the active areas of the anode 1 and cathode 2.

Examples of other suitable anode structures are described in inventor's U.S. Pat. No. 5,874,182. The porosity of the porous material and the catalyst loading and geometric distribution for such other anode structures are also selected so that a sufficient amount of fuel is reacted in the anode for useful voltage output by the fuel cell.

Similar to the anode, the cathode 2 comprises a porous layer having properties that provide sufficient strength and rigidity to serve as a support structure for the cathode 2, given that there is no support structure between the anode 1 and cathode 2. The porous layer is loaded with catalytic material that serves to catalyze the oxidant (oxygen in air) as required by the electrochemical reaction. While any catalytic material suitable for this purpose can be used as is known to one skilled in the art, it is preferable to use a platinum group metal (PGM) as catalyst as such materials are known to be one of better catalytic materials for this purpose; because fuel crossover is prevented or at least sufficiently reduced, such catalysts can be used instead of lower performing fuel tolerant catalytic materials as is known in the art.

Alternatively, an electrically non-conductive porous spacer (not shown) can be provided between the active areas of the anode 1 and cathode 2 to provide some or all of the support for the electrodes 1, 2 in the fuel cell. Such porous spacer can be for example, bars or a grid that extends across the anode and cathode surfaces. The porous spacer is designed to provide structural support between electrodes as well as to prevent interelectrode contact. The porous spacer is provided with one or more openings selected so that the porous spacer provides little or no impedance to fluid communication between the cathode 2 and anode 1; it is understood that the openings can be pores or other types of openings. In this sense, the o-ring gasket 3 can be thought of as porous spacer having a single opening equal in size to the entire active surface of the anode or cathode. Examples of suitable porous spacers can be those shown at page 67, Figure 3.5 of *A First Course in Electrochemical Engineering*, Frank Walsh, The Electro synthesis Co Inc, New York; however it is noted that while a porous spacer in that publication is defined to have openings in the range of 0.5 mm to 12 mm, the porous spacer of this embodiment can have openings from 0.5 mm to and beyond 12 mm.

Figure 2:
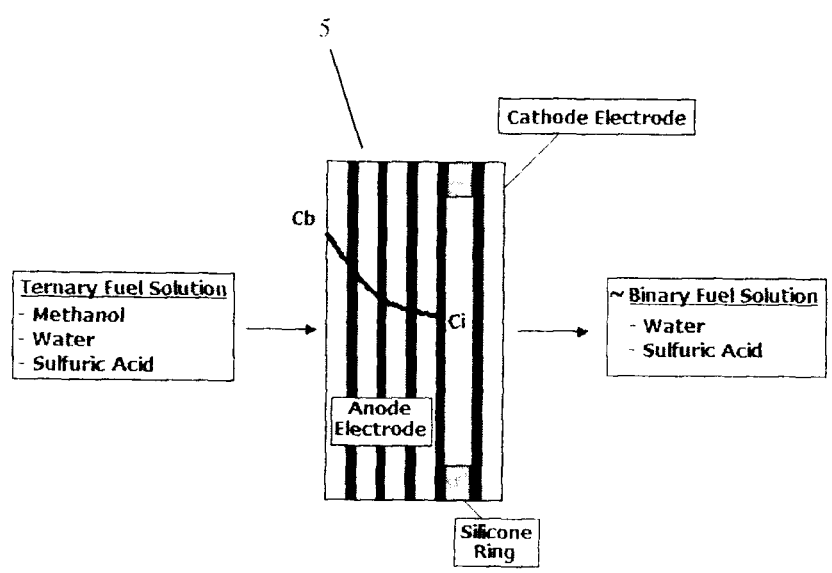
FIG. 2 is a schematic illustration of a multi-layered anode of the membraneless fuel cell.

Referring now to FIG. 2 and according to an alternative embodiment, the anode 1 is comprised of a multilayered electrode structure 5. In this example, four layers of porous electrically conductive sheet material is provided with catalyst particles disposed at both major planar surfaces of each layer (shown as black bars in the Figure). Again, the characteristics of the anode 1 such as porosity of the porous layers and the amount and distribution of the catalyst are selected so that a sufficient amount of fuel is reacted in the anode for a useful voltage output by the fuel cell.

The structure of the anode 1 optimizes the triple phase boundary (TPB) area within the electrode such that as fuel passes over and/or through the anode 1 the fuel is consumed in electrochemical reactions at the TPBs such that the concentration of fuel is significantly reduced in solution. As shown schematically in FIG. 2, multiple anode layers 5 can be stacked together to increase the thickness of the overall structure and the dispersion of catalyst therethrough. In this Figure, the initial (or bulk) concentration of the fuel, $C_b$, on the incident side of the 3D anode is reduced as it passes through the anode 1 until it reaches the electrode/solution interface on the other side of the electrode, at which point its concentration, $C_i$, is much lower than that of $C_b$ or is effectively zero, resulting in no or minimal fuel crossover. Therefore, there is no need for an ion exchange membrane or microporous separator to separate or impede the fuel in the anode 1 from reaching the cathode 2. The only requirement is for an electrolyte that can ionically conduct the ions from the anode 1 to the cathode 2; in this embodiment, such function is provided by the acid in the fuel solution, which fills up the chamber 4 in between the cathode 2 and anode 1.

It is noted that in this description, a "separator" means a structure which serves to separate or impede the transport of fuel in the anode side of the fuel cell from the cathode side of the fuel cell, e.g. by serving as convection and diffusion barriers to the fuel. The separator can but does not need to also serve to conduct ions between the electrodes, to provide mechanical support for the electrodes, and to physically space the electrodes from each other to prevent short circuiting.

The two most common types of separator known in the art for use in direct fuel cells are (1) microporous separators and (2) ion exchange membranes. While some texts consider porous spacers to be a type of separator, such are not considered separators at least for the purposes of this description, since porous spacers provide little or no resistance to fluid communication between the electrodes. A microporous separator while permitting both solvent and solute as well as ions to transport due to hydraulic permeability, act as both convection and diffusion barriers due to their relatively small pore size (typically 0.1 μm to 50 μm); examples of microporous separators include porous ceramics and porous polymers. An ion exchange membrane divides the fuel cell into two hydraulically separated compartments and function as barriers to convection and diffusion while permitting selective migration of ions. Ion exchange membranes have "chemically" designed pores of molecular size, typically in the range of $10^{-9}$ to $10^{-8}$ m, and include fluorocarbon and hydrocarbon materials which are designed to have ion exchange groupings distributed through their structure.

One significant advantage of the present embodiment of the invention is that the fuel cell design does not require a microporous separator or ion exchange membrane; this saves significantly on component cost and complexity, especially when compared to fuel cells which use a costly PEM as a separator. Furthermore, the fuel cell of this embodiment should be more durable as separators such as PEMs can degrade over time or fail after repeated use.

According to the second embodiment of the invention as shown in FIG. 1(b), the separator-free fuel cell has the face of one or both electrodes 1, 2 coated with non-conductive material 10 such as Teflon™ or another type of electrically insulating and coatable polymer or other material. The coating 10 is on the inner face of the electrode 1,2, i.e. the surface of the electrode 1, 2 facing the other electrode 1,2. The non-conductive coating 10 can be brushed on or dropped on the electrode face such that it doesn't penetrate into the porous layer's structure. Once coated, the anode 1 and cathode 2 are electrically isolated from each other and are arranged so that they are in contact with each other. Such an arrangement results in a more compact design than a fuel cell having a separator or an electrolyte chamber in between the anode and cathode.

According to another embodiment of the invention and referring to FIGS. 4 and 5, there is provided an electrically conductive diffusion barrier 6 positioned between a fuel reservoir 8 and anode 1, which serves to control the fuel flux to the anode 1. The diffusion barrier 6 is made from perforated graphitic material, and serves the dual purpose of current collection and the control of methanol flux. An advantage of using a flexible graphitic sheet is that its physical characteristics such as thickness, pore size, shape and distribution can be controlled in a known way. In this way, various transport schemes can be designed. Although graphitic sheets are used in this embodiment, other perforated materials can also be used, such as a perforated metal foil.

Alternatively, the diffusion barrier can be made from any porous material and can be either electrically conductive and insulating. When electrically conductive, the diffusion barrier can act as a current collector for the fuel cell.

Fick's first law governs the flux (J) of methanol through the diffusion barrier 6. In a porous media where a solute is diffusing through fluid filled pores, the effective diffusion coefficient ($D_{eff}$) is dependent on the diffusion coefficient in the pores (D), the porosity ($\epsilon$) and the actual pore length per distance (a) in the direction of diffusion (Equation 1). The value "a" provides an indication of the tortuosity of the path, however in the case of graphitic foil barriers, where the pores are straight, a=1.

$$J = -D_{eff}\frac{dc}{dx} = -D\frac{\epsilon}{a^2}\left(\frac{dc}{dx}\right) \quad (1)$$

According to the above equation, the concentration of methanol reaching the first surface of the anode 1 can be controlled by optimizing the porosity and the diffusion barrier thickness.

Presently, DMFCs often use dilute methanol solutions to help mitigate crossover however this can severely limit the energy density of the system. Due to the size restrictions of many mobile electronic applications, it is desirable to maximize the concentration ($C_{CH3OH, bulk}$) of the fuel reservoir 8 without intensifying the problem of crossover. FIGS. 5(a) and (b) show a comparison of the concentration profile of a separator-free electrode assembly with and without a diffusion barrier 6.

The above embodiments have been described by way of example. It will be apparent to persons skilled in the art that a number of variations and modifications can be made without departing from the scope of the invention as defined in the claims. Experimental embodiments of the invention are discussed in the following Examples. The following Examples are provided to further aid in the illustration and description of the invention, without meaning to limit the invention to the materials or methods described in these Examples.

EXAMPLES

Experimental Details

A direct liquid fuel cell (DLFC) based on a separator-free architecture has been fabricated and tested. Shown in FIG. 6 are the components of the test cell.

The electrodes were prepared using a spray deposition method. For both the anode and cathode electrodes, an 11 cm×11 cm sample of Etek-TGPH-060 carbon fiber paper with 20% wet proofing was used. On the anode, a loading of 1, 2, 4, or 7 mg·cm$^{-2}$ carbon supported (Vulcan XC-72) Pt—Ru catalyst with a Nafion® loading of 30 wt % was applied. On the cathode, a loading of 1.34 mg·cm$^{-2}$ carbon supported (Vulcan XC-72) Pt catalyst with a Nafion® loading of 30 wt % and a carbon sublayer was applied. From the 11 cm×11 cm electrode, smaller samples with a diameter of 16.5 mm were cut. Prior to experimentation, the electrodes were submerged in 0.5M $H_2SO_4$ and placed in a vacuum oven for 15 minutes to a ensure uptake of the electrolyte.

Samples of Fisherbrand G4 inert borosilicate glass filter paper were cut into samples with a diameter of 25 mm. Prior to experimentation, the samples were soaked in 0.5M $H_2SO_4$ to ensure steady state uptake of the electrolyte. In the preparation of Nafion® 117 (N117) supplied by Ion Power®, the membrane samples were: a) boiled in 3% $H_2O_2$ for 30 minutes b) rinsed under deionized water c) boiled in deionized water for 30 minutes d) rinsed under deionized water e) boiled in 0.5M $H_2SO_4$ for 30 minutes f) rinsed under deionized water and g) stored in deionized water. Prior to experimentation, the membranes were soaked in 0.5M $H_2SO_4$ overnight to ensure steady state uptake of the electrolyte and then cut into circular samples with a diameter of 25 mm. Dow Corning Siliastic J-RTV silicone rubber and curing agent was moulded into flat sheets with a thickness of 1 mm. The membraneless silicone separator was cut into a ringed shape with an outer diameter of 25 mm and an inner diameter of 16 mm.

Figures 6A, 6B:
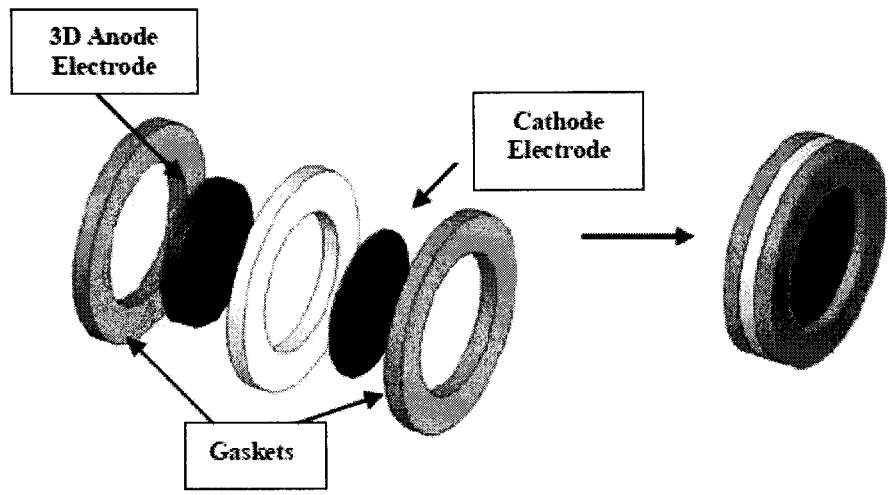
FIG. 6(a) is schematic perspective exploded view of a membraneless electrode assembly having an o-ring silicone spacer and FIG. 6(b) is a schematic perspective view of the compressed electrode assembly.
Figure 7:
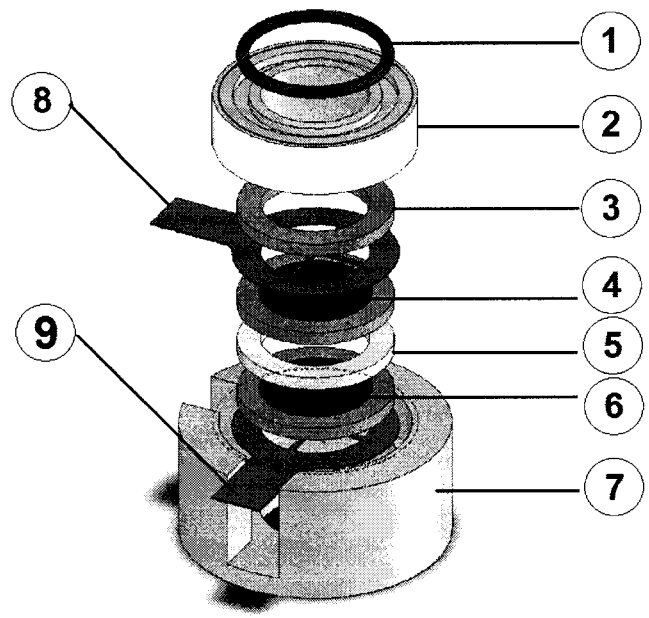
FIG. 7 is a schematic perspective view of an electrode assembly holder used in the experiment comprising: 1) O-ring, 2) Holder Top, 3) Gasket, 4) Cathode Electrode, 5) Spacer, 6) 3D Anode Electrodes, 7) Holder Base, 8) Cathode Current Collector 9) Anode Collector (can also be a conductive diffusion barrier).

The electrode assembly, shown in FIG. 6*a*, was incorporated into the electrode assembly holder with an active area of 2.0 cm$^2$ (FIG. 7) and was clamped to a single glass chamber.

In preliminary testing, a 1M-methanol & 0.5M $H_2SO_4$/$H_2O$ fuel solution was added to the anode chamber and the cathode electrode was open to the air. The fuel cell was examined at ambient conditions (i.e. Temperature & Pressure) with a Solartron 1420E Multistat operated in galvanostatic mode with the voltage being recorded over time at varying absolute currents. Polarization curves were developed by plotting the cell voltage versus the current density.

Example 1

Standard Membrane Electrode Assembly (not Hot Pressed)

Figure 8:
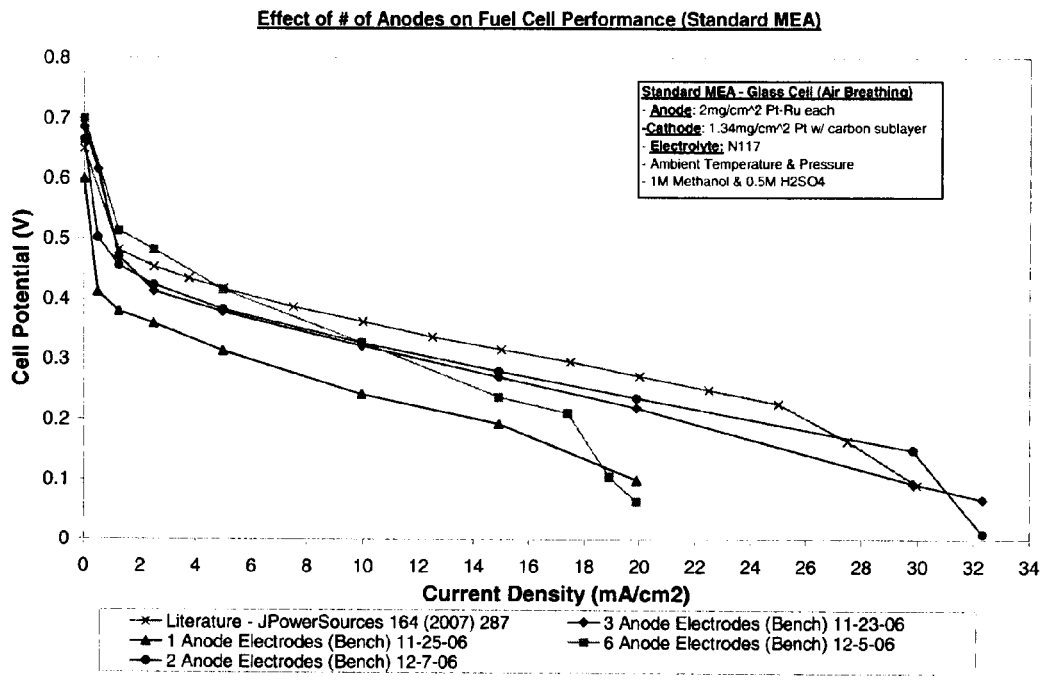
FIGS. 8 and 9 are graphs of the effect of number of anode layers on fuel cell performance of a conventional membrane electrode assembly test fuel cell.
Figure 9:
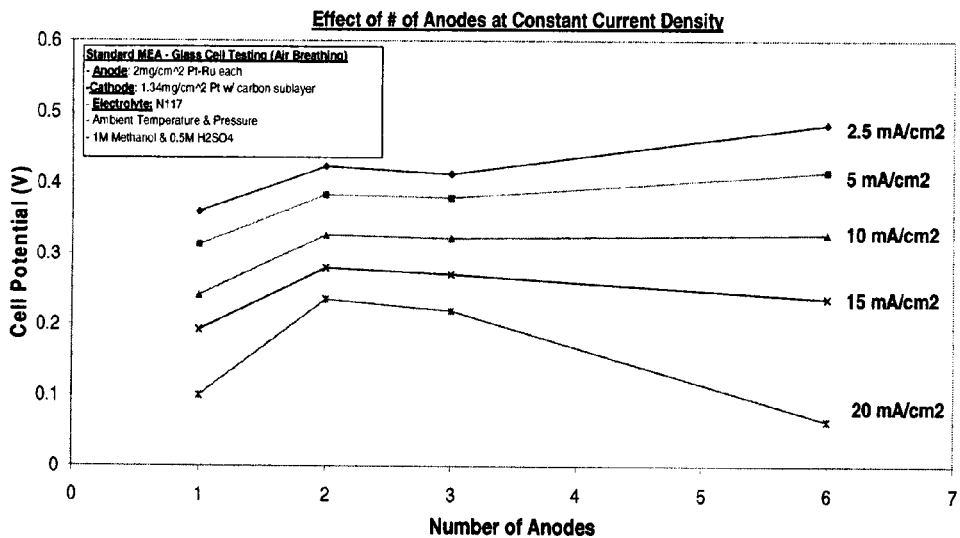

The effect of multiple anodes, used as a layered stack in the fuel cell, was investigated in the glass cell apparatus using an otherwise conventional direct methanol fuel cell (DMFC) architecture with the typical membrane electrode assembly (MEA). As a benchmark, a highly performing MEA, as described by Martin et al., was also tested under the same conditions. The results are shown in the two graphs shown in FIGS. 8 and 9.

Example 2

Hydrophilic Glass Filter Paper Separator

Figure 10:
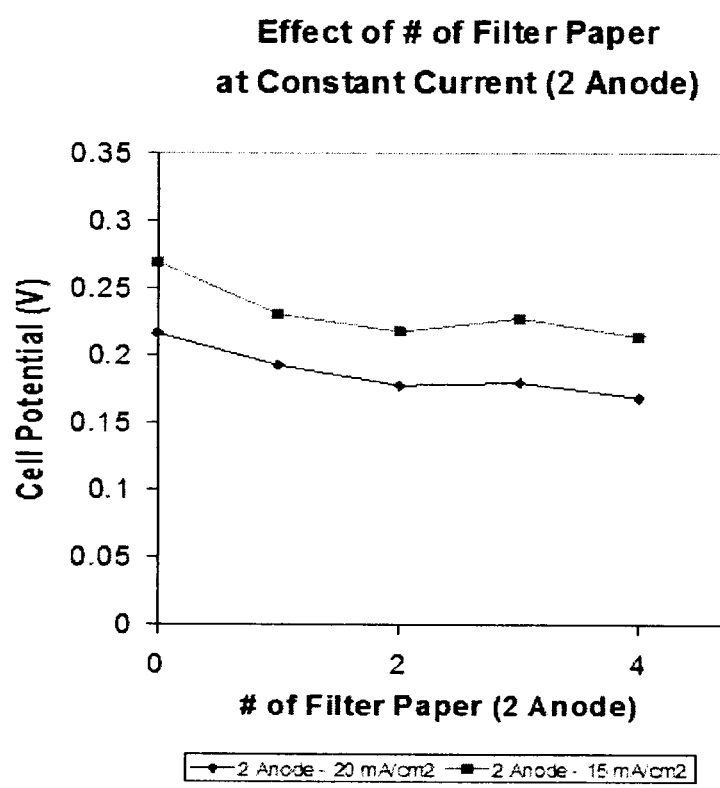
FIG. 10 is a graph of the effect of a number of filter paper separators for a two anode layer test fuel cell at constant current.
Figure 11:
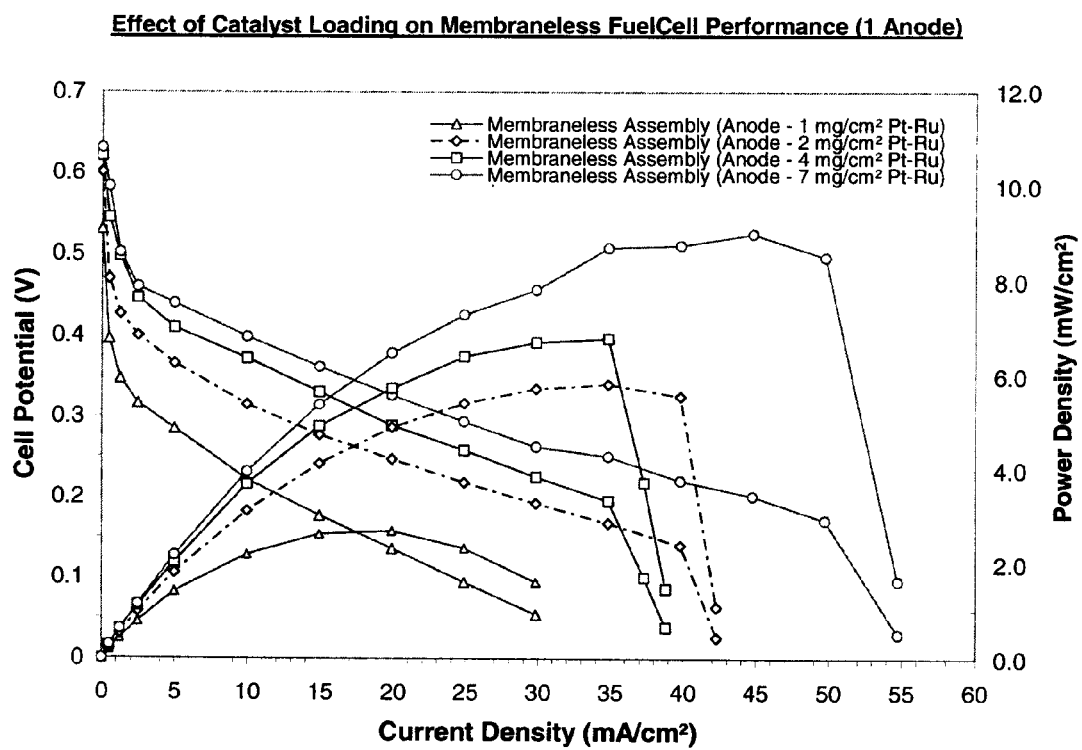
FIGS. 11 to 14 are graphs of the effect of catalyst loading on fuel cell performance of a one, two, three and six anode layer test fuel cell, respectively.
Figure 12:
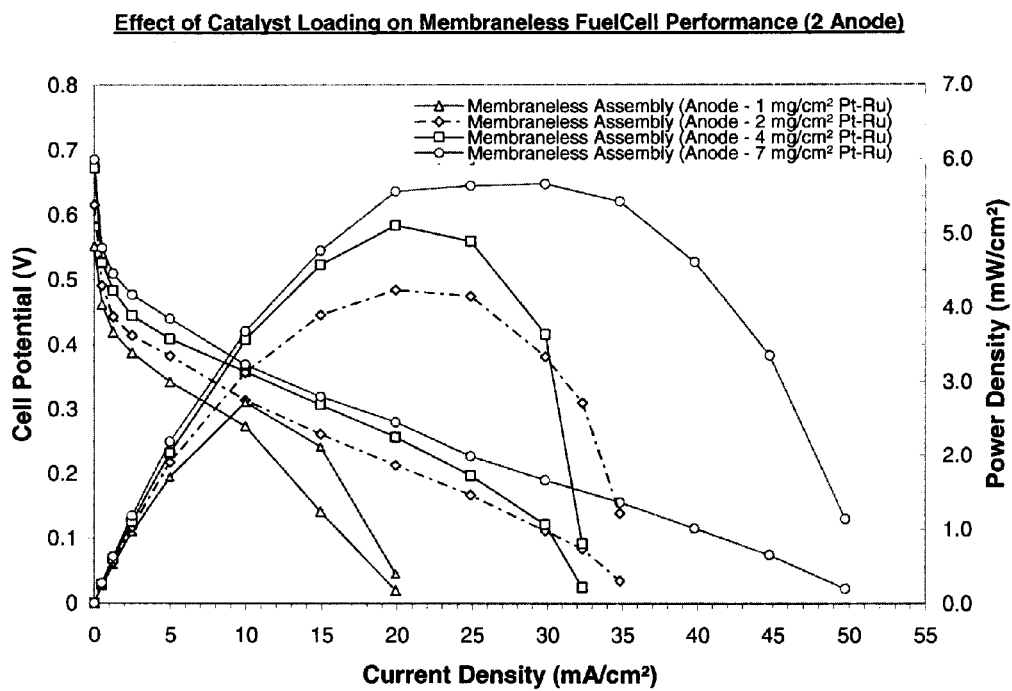
Figure 13:
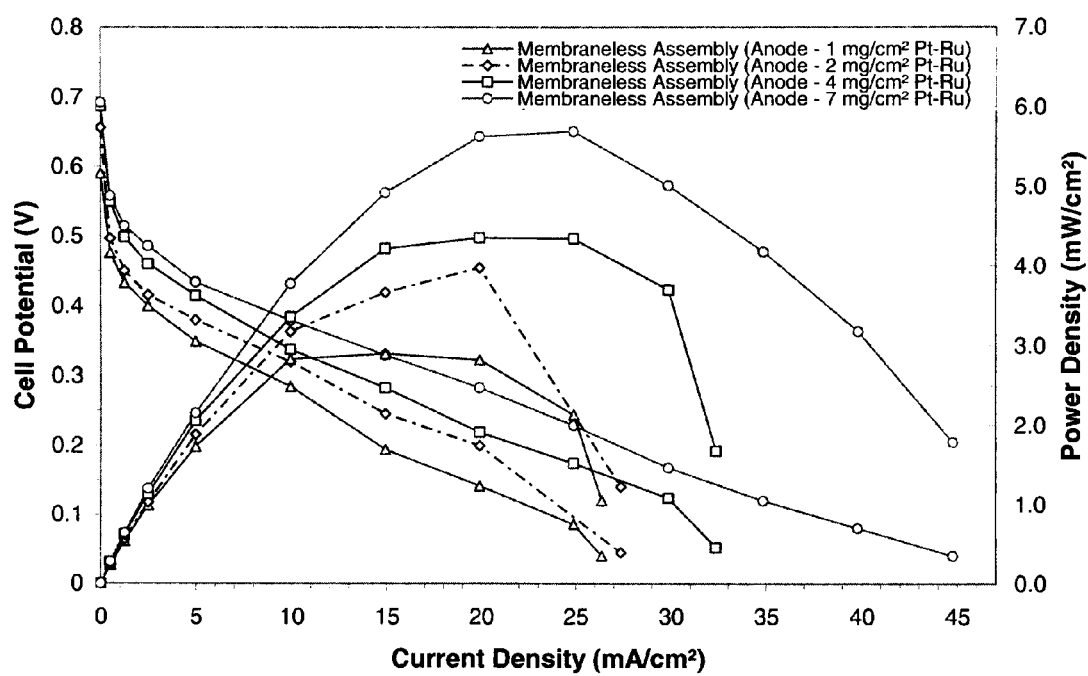
Figure 14:
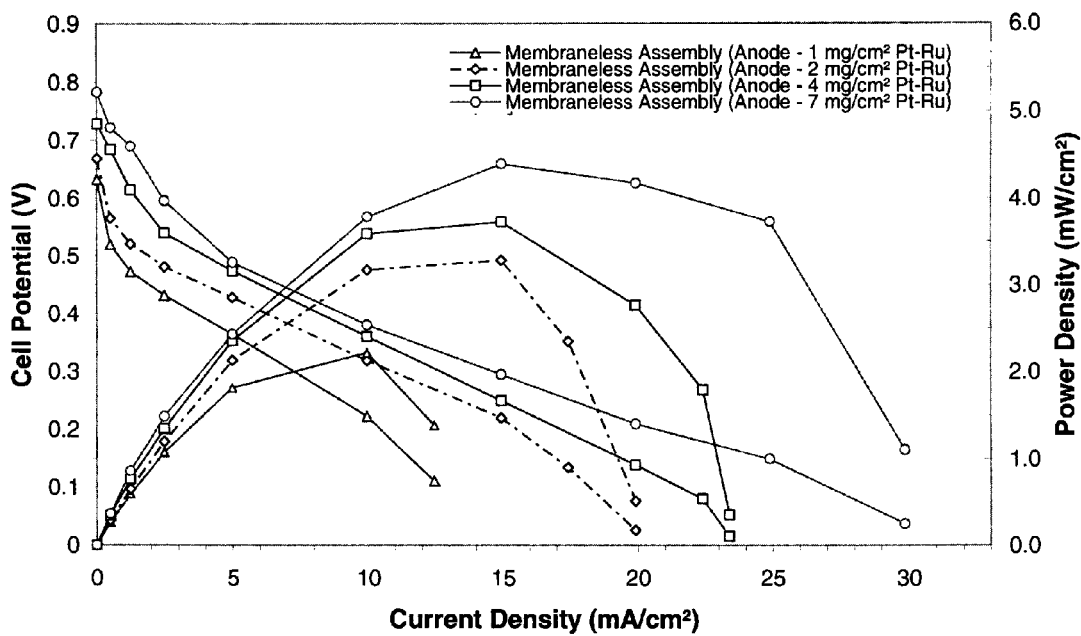
Figure 15:
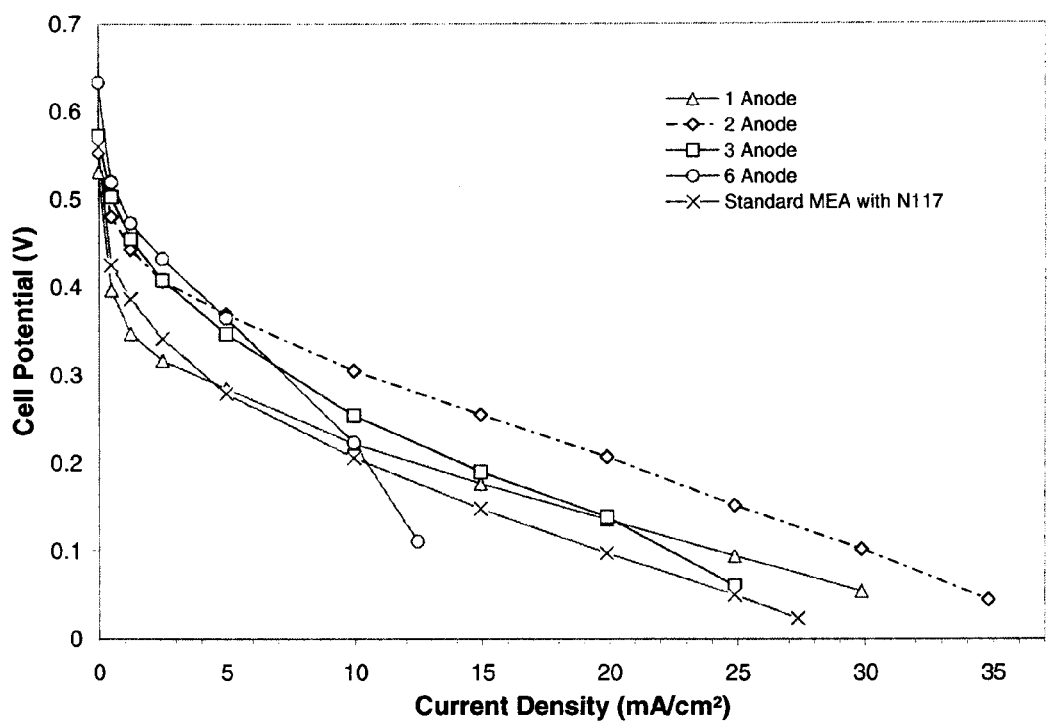
FIG. 15 is a graph of a number of anode layers on fuel cell performance of a test fuel cell.
Figure 16:
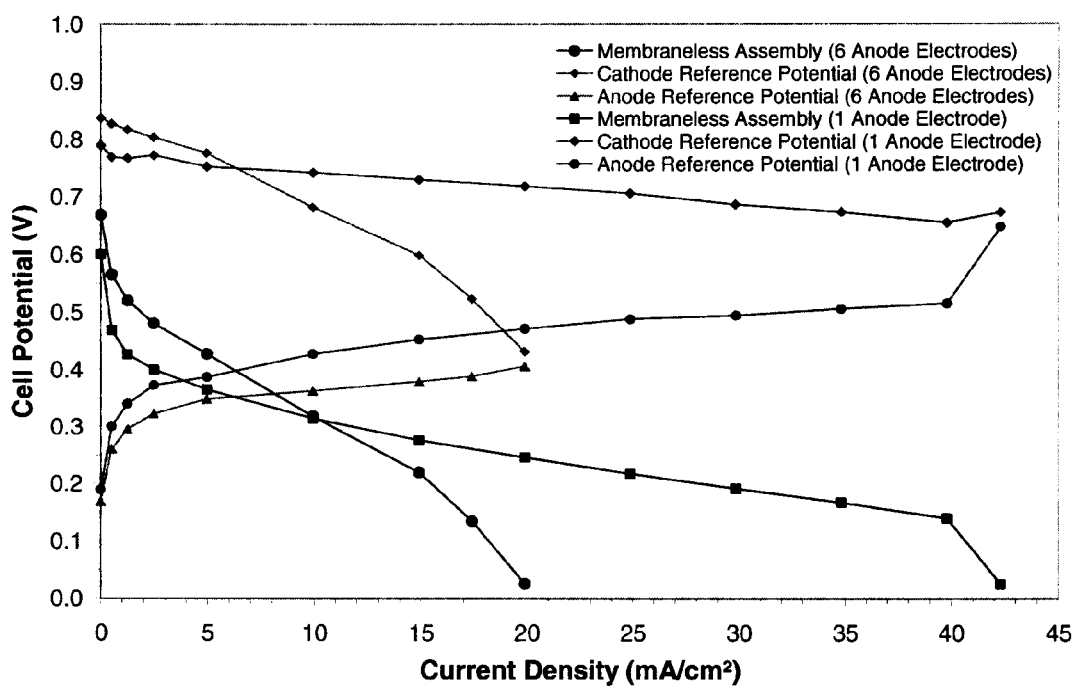
FIGS. 16 and 17 are graphs comparing electrode reference potentials of one and six anode layer test fuel cells at 2 mg/cm$^2$ catalyst loading and 7 mg/cm$^2$ catalyst loading, respectively.
Figure 17:
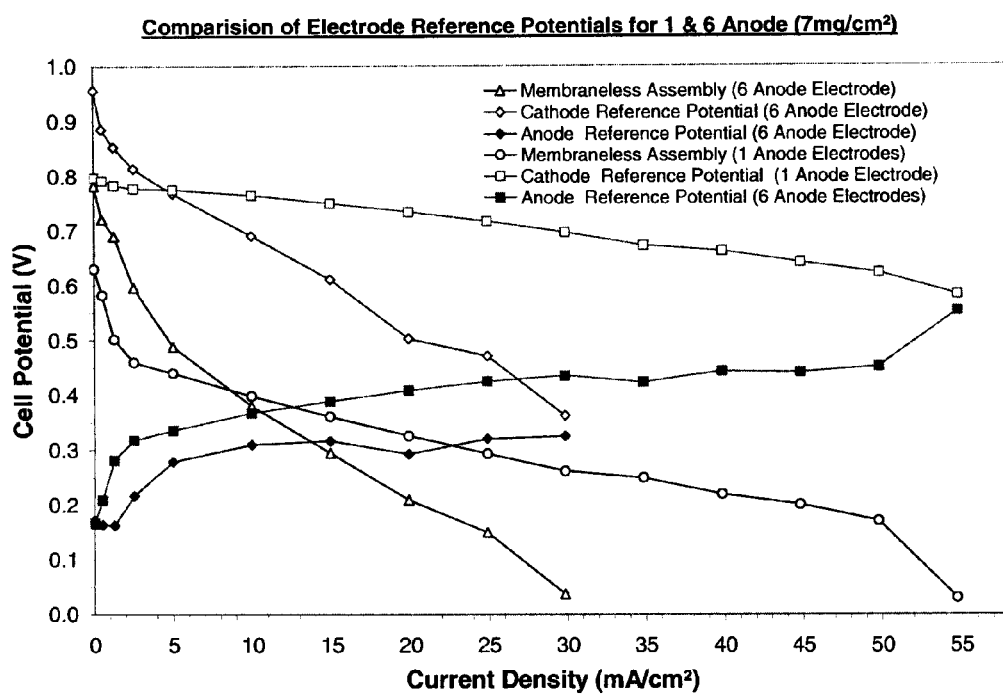

In a series of experiments, the conventional MEA was not used, but rather a glass filter paper separator was sandwiched between the anode and cathode. The DMFC was then tested under similar conditions, using the literature benchmark MEA as a reference. The effects of the number of filter paper separators were investigated. The results of the experiments are shown in FIG. 10. Good performance in the absence of the filter paper separators was achieved.

Example 3

Membraneless Silicone Spacer

The performance of the membraneless DMFC, using a silicone O-ring spacer to space the electrodes apart, was tested under similar conditions. The effects of the catalyst loading and the number of anodes employed were investigated, and the results are shown in the seven graphs shown in FIGS. 11 to 17.

Example 4

Membraneless Silicone Spacer vs Standard MEA

Figure 18:
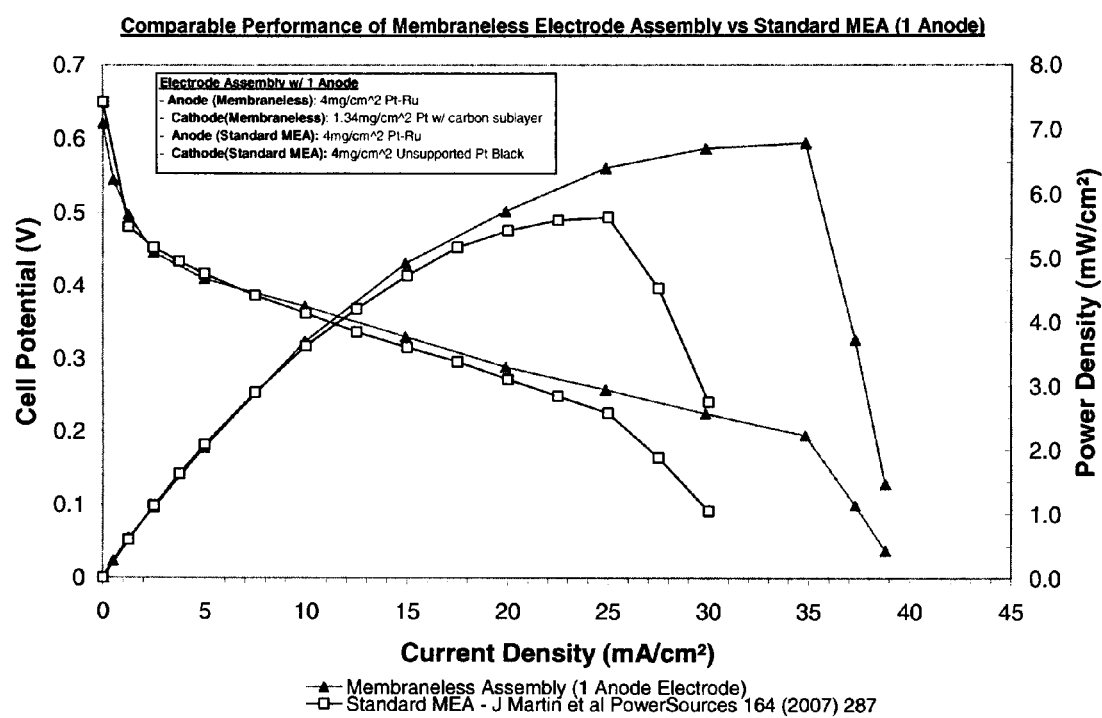
FIG. 18 is a graph comparing performance of a conventional MEA and a test membraneless fuel cell (one anode layer).

For comparison, the resulting performance of the novel membraneless design was evaluated against an ambient passive air breathing DMFC found in the literature (e.g. J. Martin et al. *Journal of Power Sources* 164 (2007) 287). In this paper, the membrane electrode assembly (MEA) was fabricated by hot pressing a Nafion® 117 membrane with commercially available ETEK A-11 electrodes. These electrodes were individually optimized for DMFC applications. The plain weave carbon cloth anode had a catalyst loading of 4 mg·cm$^{-2}$ with an 80% Pt:Ru alloy on optimized carbon. The satin weave carbon cloth cathode had a loading of 4 mg·cm$^{-2}$ unsupported Pt black. The results are shown in the graph in FIG. 18, and demonstrate the high performance characteristics possible with the use of the membraneless fuel cell architecture.

Example 5

Membraneless Silicone Spacer with Different Fuel

Figure 19:
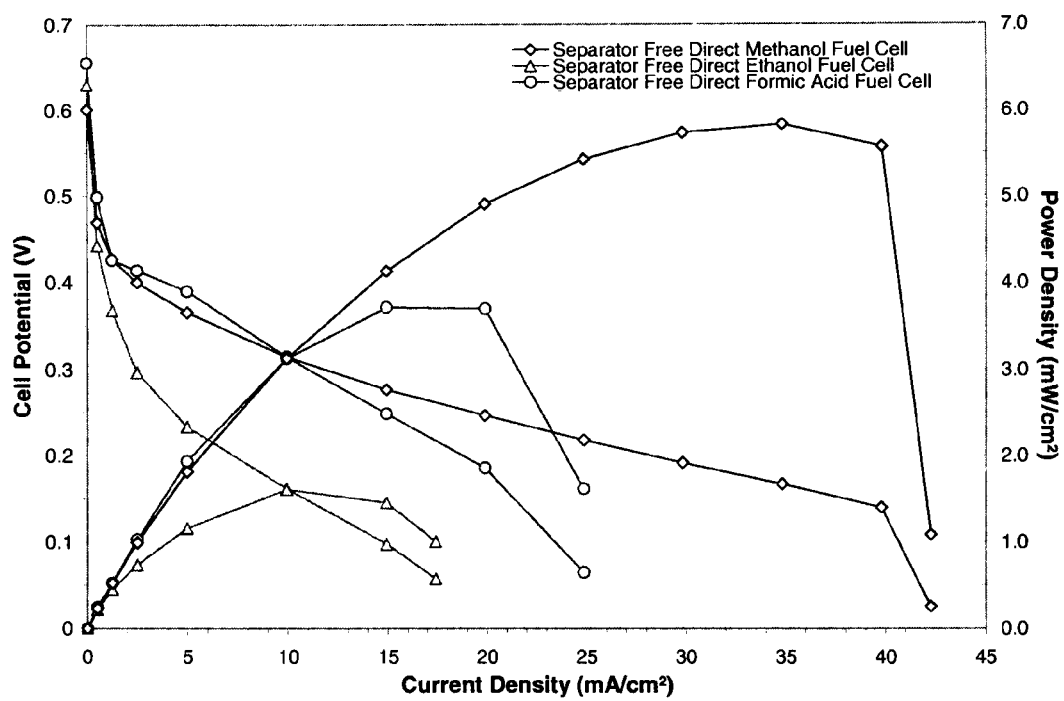
FIG. 19 is a graph showing the performance of test membraneless fuel cells using methanol, formic acid and ethanol fuels.

The use of this membraneless fuel cell architecture is general, and not limited to methanol fuel cells. To demonstrate this, the similar cell architecture to that already described in this application was applied to direct fuel cells that operate on formic acid and on ethanol as fuel. Results are shown in FIG. 19.

Example 6

Scale-Up

The scale up capability of the novel design was examined with a conventional 4 cm$^2$ bipolar plate cell configuration. The anodic graphite plate had an open pocket with a depth of 2 mm and the cathodic plate had a serpentine flow field. The air flow rate and oxygen stoichiometry was controlled by an upstream rotameter.

Figure 20:
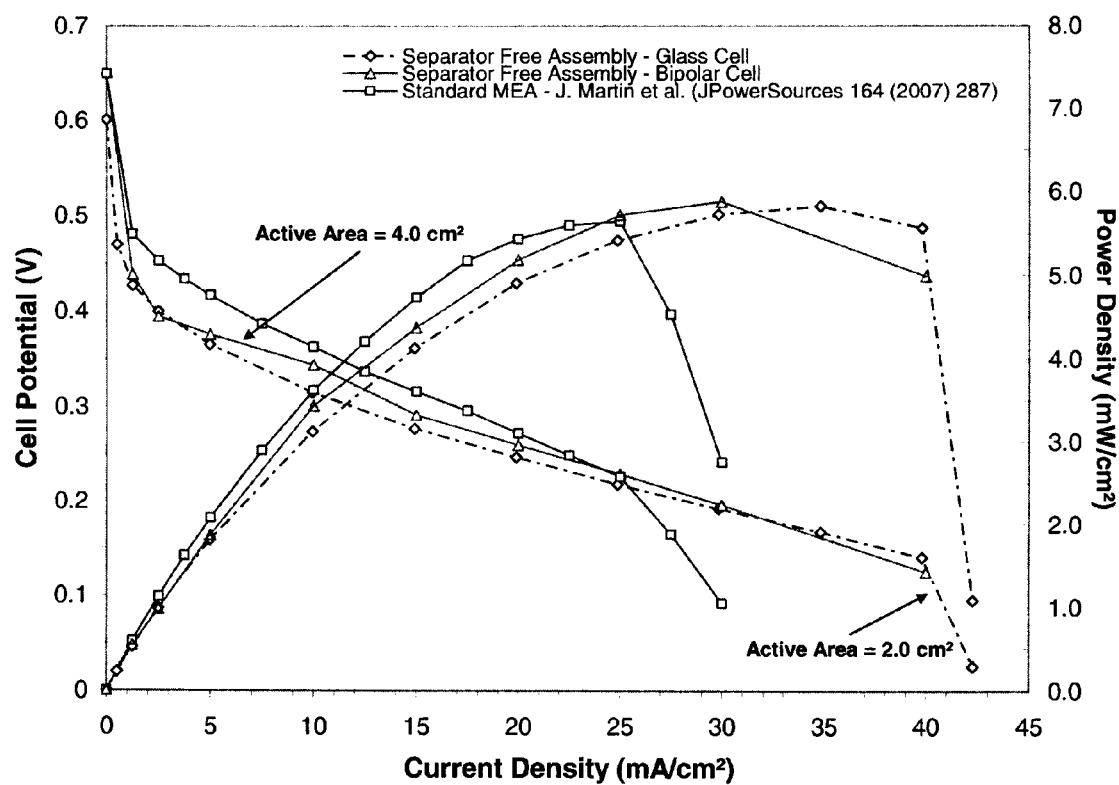
FIG. 20 is a graph illustrating the scale up potential of a membraneless fuel cell.

Results of these investigations are show in FIG. 20, including a comparison to the benchmark cell from the literature.

Example 7

Diffusion Barrier

Figure 21:
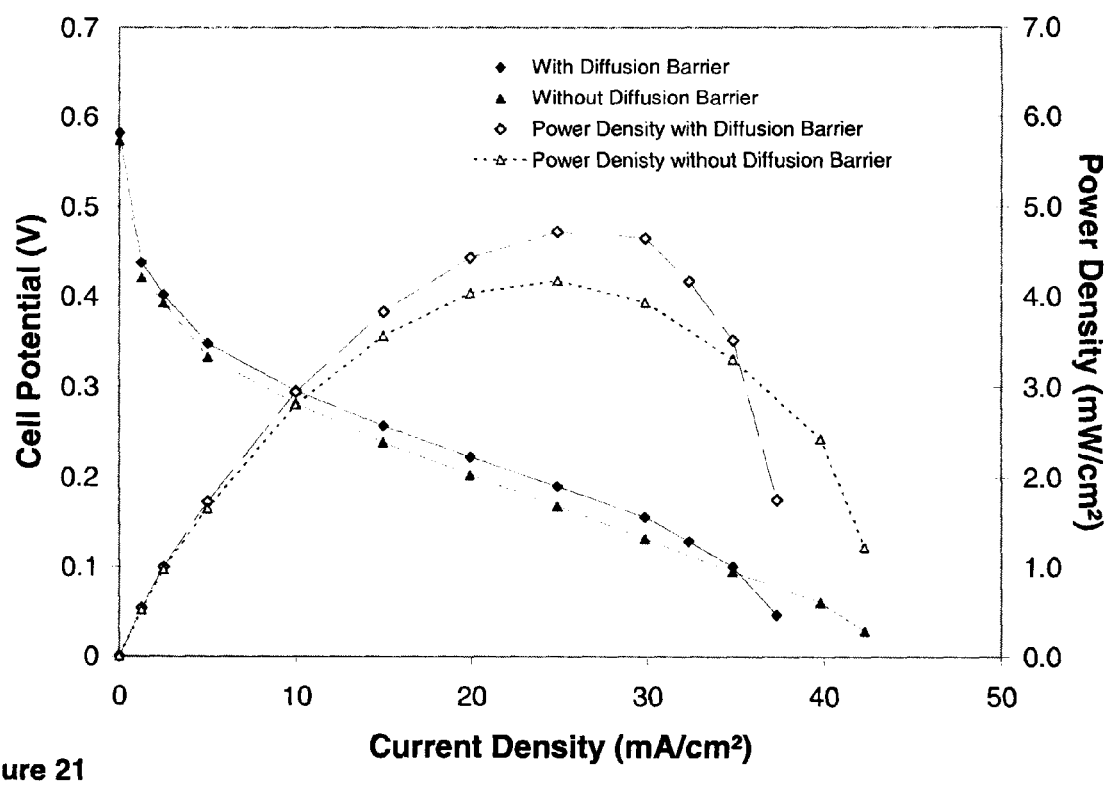
FIG. 21 is a graph showing the performance of a membraneless DMFC with and without a diffusion barrier.

A diffusion barrier may also be incorporated into the membraneless fuel cell. Comparison of polarization curves for a membraneless DMFC operated at ambient temperature and pressure, with and without a diffusion barrier, is shown in FIG. 21. In this example a perforated graphitic diffusion barrier is used.

The invention claimed is:

1. A direct fuel cell comprising:
a cathode comprising electroactive catalyst material; and
an anode assembly comprising an anode having a porous layer and electroactive catalyst material in the porous layer, electrode characteristics of the anode assembly selected so that fuel supplied to the anode is reacted within the anode so that cross-over from the anode to the cathode does not have more than a 10% negative effect on voltage or a 25 mV voltage loss when at peak power and steady state conditions;
the anode and cathode each having a first major surface facing each other in non-electrical contact and without a microporous separator or ion exchange membrane therebetween, and the fuel being supplied to the anode is in a fuel and electrolyte solution; and
wherein the cathode catalyst comprises a platinum group metal.

2. A fuel cell as claimed in claim 1 wherein the anode assembly is sufficiently porous for the fuel and electrolyte to transport through the anode assembly.

3. A fuel cell as claimed in claim 2 wherein in the anode, the catalyst is distributed through the thickness of the porous layer.

4. A fuel cell as claimed in claim 3 wherein the selected electrode characteristics include at least one of a porous layer porosity, a porous layer hydrophobicity, a catalyst distribution and a catalyst quantity.

5. A fuel cell as claimed in claim 2 wherein the anode comprises multiple catalyst-containing porous layers in adjacent contacting and stacked arrangement.

6. A fuel cell as claimed in claim 2 wherein the anode assembly further comprises a fuel reservoir containing the fuel and electrolyte solution in fluid communication with a second major surface of the porous layer which is oppositely facing the anode's first major surface.

7. A fuel cell as claimed in claim 6 wherein the anode assembly further comprises a diffusion barrier between the fuel reservoir and the anode and wherein the selected electrode characteristics include the characteristics of the diffusion barrier.

8. A fuel cell as claimed in claim 7 wherein the selected diffusion barrier characteristics include one or more of the thickness, pore size, shape and distribution of the pores.

9. A fuel cell as claimed in claim 8 wherein the diffusion barrier is electrically conductive and serves as a current collector for the fuel cell.

10. A fuel cell as claimed in claim 7 wherein the diffusion barrier is selected from the group consisting of a perforated graphitic foil and perforated metal foil.

11. A fuel cell as claimed in claim 1 wherein the anode and cathode are spaced from each other by an electrolyte chamber for containing a solution of electrolyte and an amount of fuel that does not have more than a 10% negative effect on voltage or a 25 mV voltage loss when at peak power and steady state conditions.

12. A fuel cell as claimed in claim 1 wherein at least one of the facing first major surfaces of the anode and cathode is coated with an electrically non-conducting material that is not a microporous separator or ion exchange membrane and the facing first major surfaces are in physical but not electrical contact with each other.

13. A fuel cell as claimed in claim 12 wherein the non-conducting material is an electrically insulating polymer that is not a microporous separator or ion exchange membrane.

14. A fuel cell as claimed in claim 2 wherein the fuel and electrolyte solution is an aqueous methanol and sulfuric acid solution.

15. A fuel cell as claimed in claim 2 wherein the fuel is selected from the group consisting of electroactive alcohols, electroactive organic acids, and electroactive ethers.

16. A fuel cell as claimed in claim 2 wherein the fuel is selected from the group consisting of propanol, methanol, formic acid, acetic acid, borohydride, ethanol, dimethylether, dimethoxymethane, trimethoxy methane, and Trioxane.

17. A fuel cell as claimed in claim 1 further comprising a non-conductive porous spacer between the active areas of the anode and cathode, the porous spacer for electrically separating and physically supporting the anode and cathode and providing substantially no resistance to fluid communication between the anode and cathode.

18. A fuel cell as claimed in claim 17 wherein the porous spacer has one or more openings with a size greater than or equal to 0.5 mm.

19. A fuel cell as claimed in claim 18 wherein the total area of the spacer openings substantially equals the active area of the anode or cathode.

* * * * *